United States Patent
Kang et al.

(10) Patent No.: US 9,019,452 B2
(45) Date of Patent: Apr. 28, 2015

(54) COMPENSATION SYSTEM AND LIQUID CRYSTAL DISPLAY APPARATUS FOR LIQUID CRYSTAL PANEL

(71) Applicant: Shenzhen China Star Optoelectronics Technology Co., Ltd., Shenzhen, Guangdong (CN)

(72) Inventors: Chih-tsung Kang, Shenzhen (CN); Bo Hai, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 239 days.

(21) Appl. No.: 13/704,987

(22) PCT Filed: Nov. 30, 2012

(86) PCT No.: PCT/CN2012/085663
§ 371 (c)(1),
(2) Date: Dec. 18, 2012

(87) PCT Pub. No.: WO2014/079096
PCT Pub. Date: May 30, 2014

(65) Prior Publication Data
US 2014/0139790 A1    May 22, 2014

(30) Foreign Application Priority Data
Nov. 21, 2012    (CN) .......................... 2012 1 0475546

(51) Int. Cl.
| | |
|---|---|
| *G02F 1/1335* | (2006.01) |
| *G02B 5/30* | (2006.01) |
| *G02F 1/13363* | (2006.01) |
| *G02F 1/139* | (2006.01) |

(52) U.S. Cl.
CPC ........ *G02B 5/3083* (2013.01); *G02F 1/133634* (2013.01); *G02F 1/1393* (2013.01); *G02F 2413/02* (2013.01); *G02F 2413/05* (2013.01); *G02F 2413/12* (2013.01)

(58) Field of Classification Search
CPC ...................... G02F 1/133634; G02F 2413/12
USPC .................................. 349/117–119
See application file for complete search history.

(56) References Cited

U.S. PATENT DOCUMENTS

2009/0207355 A1* 8/2009 Yanai et al. .................... 349/119
2011/0051062 A1* 3/2011 Sakai ........................... 349/120

* cited by examiner

*Primary Examiner* — Paisley L Arendt
(74) *Attorney, Agent, or Firm* — Andrew C. Cheng (57) ABSTRACT

The present invention discloses a compensation system and a liquid crystal display apparatus used for a liquid crystal panel. The compensation system comprises a first biaxial retardation film and a second biaxial retardation film respectively disposed on either side of the liquid crystal panel. An in-plane retardation value of the first biaxial retardation film at a wavelength of 550 nm is Ro1. An out-of-plane retardation value in a thickness direction is Rth1. An in-plane retardation value of the second biaxial retardation film at the wavelength of 550 nm is Ro2. An out-of-plane retardation value in a thickness direction is Rth2. Wherein: 30.8 nm≤Ro1≤91 nm; 70.4 nm≤Rth1≤208 nm; 21 nm≤Ro2≤93.8 nm; Y1≤Rth2≤Y2; $Y1=0.00424817 \times Rth1^2 - 1.9854256 \times Rth1 + 277.7$; $Y2=-0.003333 \times Rth1^2 - 0.033459 \times Rth1 + 234.2$. The present invention effectively reduces light leakage of the liquid crystal panel in dark mode by disposing the double-layered biaxial retardation films having reasonable retardation values.

7 Claims, 6 Drawing Sheets

COMPENSATION SYSTEM AND LIQUID CRYSTAL DISPLAY APPARATUS FOR LIQUID CRYSTAL PANEL

BACKGROUND OF THE INVENTION

1. Field of the Invention

The present invention relates to a liquid crystal display (LCD) technology, more particularly, to a compensation system and a liquid crystal display apparatus for a liquid crystal panel.

2. Description of the Related Art

With the development of technology, a liquid crystal display apparatus has become the mainstream of the display apparatus. However, when the viewing angles of the liquid crystal display apparatus are enlarged, the contrast of pictures is reduced and the sharpness is lowered. The reason lies in that the birefringence of the liquid crystal molecules of the liquid crystal layer changes as a result of the change of the viewing angle. Light leakage of dark images is effectively reduced if a wide view film (WVF) is utilized. Hence, the contrast of pictures is significantly increased within a certain range of viewing angles. A retardation film, usually applied to a vertical alignment (VA) mode, mainly comprises a single-layered biaxial retardation film or a double-layered biaxial retardation film. For different optical path differences of liquid crystals ($\Delta n \times d$), the minimum light leakage in dark mode is achieved by utilizing retardation films having different retardation values. If an unmatched retardation film is utilized with the liquid crystal display apparatus, not only does light leakage in dark mode occur at large viewing angles but also the contrast and sharpness at large viewing angles are affected.

Figure 1:
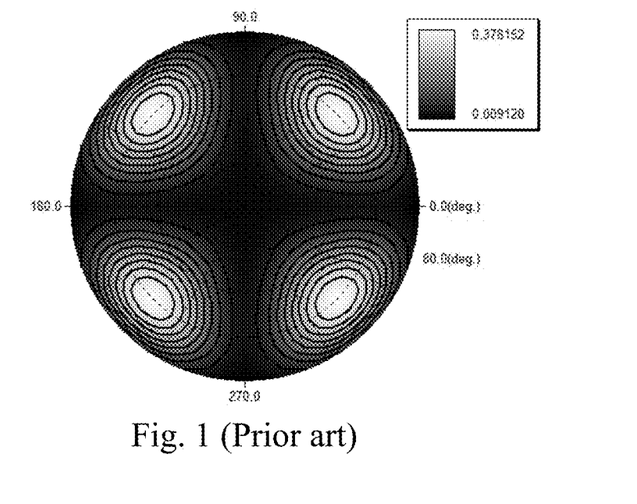
FIG. 1 is a simulation diagram of a distribution of light leakage in dark mode after being compensated by a prior art double-layered biaxial retardation film.
Figure 2:
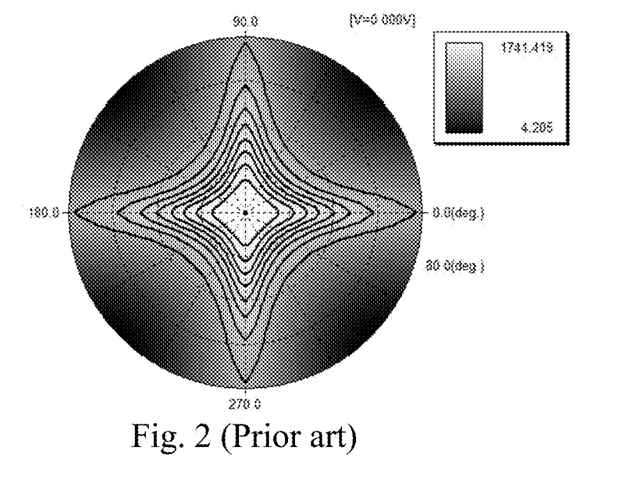
FIG. 2 is a simulation diagram of a distribution of contrast over all viewing angles after being compensated by the prior art double-layered biaxial retardation film.

Please refer to FIG. 1 and FIG. 2, FIG. 1 shows a simulation of a distribution of light leakage in dark mode after being compensated by a conventional double-layered biaxial retardation film. FIG. 2 shows a simulation of a distribution of contrast over all viewing angles after being compensated by the conventional double-layered biaxial retardation film. The optical path difference of liquid crystal $\Delta n \times d$ is set at 342.8 nm. The in-plane retardation value of the double-layered biaxial retardation films Ro is 70 nm, and the out-of-plane retardation value in a thickness direction of the double-layered biaxial retardation film Rth is 160 nm. As can be seen from FIG. 1 and FIG. 2, under these circumstances there is severe light leakage problem in areas at azimuth angles between 30 degrees and 60 degrees, 120 degrees and 150 degrees, 210 degrees and 240 degrees, and 300 degrees and 330 degrees even after being compensated by the double-layered biaxial retardation film. As a result, the contrast along these viewing angles is lowered.

Therefore, it is very important to provide a compensation system and a liquid crystal display apparatus used for a liquid crystal panel to resolve the above-mentioned problem.

SUMMARY OF THE INVENTION

The present invention provides a compensation system and a liquid crystal display apparatus used for a liquid crystal panel to effectively reduce light leakage of the liquid crystal panel in dark mode.

The present invention provides a liquid crystal display apparatus. The liquid crystal display apparatus comprises a liquid crystal panel and a first biaxial retardation film and a second biaxial retardation film.

The liquid crystal panel comprises a liquid crystal layer having a plurality of liquid crystal molecules. Birefringence to a refractive index of the liquid crystal layer at a wavelength of 550 nm is $\Delta n$. A thickness of the liquid crystal layer is d. A pre-tilt angle of the liquid crystal molecules is $\theta$.

An in-plane retardation value of the first biaxial retardation film at the wavelength of 550 nm is Ro1. An out-of-plane retardation value in a thickness direction of the first biaxial retardation film at the wavelength of 550 nm is Rth1. An in-plane retardation value of the second biaxial retardation film at the wavelength of 550 nm is Ro2. An out-of-plane retardation value in a thickness direction of the second biaxial retardation film at the wavelength of 550 nm is Rth2. Wherein:

$$324.3 \text{ nm} \leq \Delta n \times d \leq 342.8 \text{ nm};$$

$$85° \leq \theta \leq 90°,$$

$$48.3 \text{ nm} \leq Ro1 = Ro2 \leq 66.5 \text{ nm};$$

$$110.4 \text{ nm} \leq Rth1 = Rth2 \leq 152 \text{ nm}.$$

The liquid crystal display apparatus further comprises a first polarizer and a second polarizer respectively disposed on either side of the liquid crystal panel. The first polarizer and the first biaxial retardation film are disposed on a same side of the liquid crystal panel. A light absorption axis of the first polarizer is 90 degrees to a slow axis of the first biaxial retardation film. The second polarizer and the second biaxial retardation film are disposed on the other side of the liquid crystal panel. A light absorption axis of the second polarizer is 90 degrees to a slow axis of the second biaxial retardation film.

The first biaxial retardation film is disposed between the first polarizer and the liquid crystal panel. The second biaxial retardation film is disposed between the second polarizer and the liquid crystal panel.

In one aspect of the present invention, the first polarizer and the second polarizer are both polyvinyl alcohol films.

In another aspect of the present invention, the liquid crystal display apparatus further comprises a first pressure sensitive adhesive film and a second pressure sensitive adhesive film. The first pressure sensitive adhesive film is disposed between the first biaxial retardation film and the liquid crystal panel. The second pressure sensitive adhesive film is disposed between the second biaxial retardation film and the liquid crystal panel.

In another aspect of the present invention, the liquid crystal display apparatus further comprises a first three cellulose acetate film and a second three cellulose acetate film. The first three cellulose acetate film is disposed on a surface of the first polarizer far from the first biaxial retardation film. The second three cellulose acetate film is disposed on a surface of the second polarizer far from the second biaxial retardation film.

The present invention further provides a compensation system used for a liquid crystal panel. The compensation system comprises a first biaxial retardation film and a second biaxial retardation film respectively disposed on either side of the liquid crystal panel. An in-plane retardation value of the first biaxial retardation film at a wavelength of 550 nm is Ro1. An out-of-plane retardation value in a thickness direction of the first biaxial retardation film at the wavelength of 550 nm is Rth1. An in-plane retardation value of the second biaxial retardation film at the wavelength of 550 nm is Ro2. An out-of-plane retardation value in a thickness direction of the second biaxial retardation film at the wavelength of 550 nm is Rth2, where $$30.8 \text{ nm} \leq Ro1 \leq 91 \text{ nm};$$

$$70.4 \text{ nm} \leq Rth1 \leq 208 \text{ nm};$$

$$21 \text{ nm} \leq Ro2 \leq 93.8 \text{ nm};$$

$$Y1 \leq Rth2 \leq Y2;$$

$$Y1 = 0.00424817 \times Rth1^2 - 1.9854256 \times Rth1 + 277.7;$$

$$Y2 = -0.003333 \times Rth1^2 - 0.033459 \times Rth1 + 234.2.$$

In one aspect of the present invention. 48.3 nm≤Ro1=Ro2≤66.5 nm, and 110.4 nm≤Rth1=Rth2≤152 nm.

In another aspect of the present invention, an optical path difference of the liquid crystal panel $\Delta n \times d$ is 324.3 nm≤$\Delta n \times d$≤342.8 nm.

The present invention provides a liquid crystal display apparatus. The liquid crystal display apparatus comprises a liquid crystal panel and a first biaxial retardation film and a second biaxial retardation film.

The liquid crystal panel comprises a liquid crystal layer having a plurality of liquid crystal molecules. Birefringence to a refractive index of the liquid crystal layer at a wavelength of 550 nm is $\Delta n$. A thickness of the liquid crystal layer is d. A pre-tilt angle of the liquid crystal molecules is θ.

An in-plane retardation value of the first biaxial retardation film at the wavelength of 550 nm is Ro1. An out-of-plane retardation value in a thickness direction of the first biaxial retardation film at the wavelength of 550 nm is Rth1. An in-plane retardation value of the second biaxial retardation film at the wavelength of 550 nm is Ro2. An out-of-plane retardation value in a thickness direction of the second biaxial retardation film at the wavelength of 550 nm is Rth2, where:

$$324.3 \text{ nm} \leq \Delta n \times d \leq 342.8 \text{ nm};$$

$$85° \leq \theta \leq 90°;$$

$$30.8 \text{ nm} \leq Ro1 \leq 91 \text{ nm};$$

$$70.4 \text{ nm} \leq Rth1 \leq 208 \text{ nm};$$

$$21 \text{ nm} \leq Ro2 \leq 93.8 \text{ nm};$$

$$Y1 \leq Rth2 \leq Y2;$$

$$Y1 = 0.00424817 \times Rth1^2 - 1.9854256 \times Rth1 + 277.7;$$

$$Y2 = -0.003333 \times Rth1^2 - 0.033459 \times Rth1 + 234.2.$$

In one aspect of the present invention, 48.3 nm≤Ro1=Ro2≤66.5 nm, and 110.4 nm≤Rth1=Rth2≤152 nm.

In another aspect of the present invention, the liquid crystal display apparatus further comprises a first polarizer and a second polarizer respectively disposed on either side of the liquid crystal panel. The first polarizer and the first biaxial retardation film are disposed on a same side of the liquid crystal panel. A light absorption axis of the first polarizer is 90 degrees to a slow axis of the first biaxial retardation film. The second polarizer and the second biaxial retardation film are disposed on the other side of the liquid crystal panel. A light absorption axis of the second polarizer is 90 degrees to a slow axis of the second biaxial retardation film.

In another aspect of the present invention, the first polarizer and the second polarizer are both polyvinyl alcohol films.

In another aspect of the present invention, the first biaxial retardation film is disposed between the first polarizer and the liquid crystal panel. The second biaxial retardation film is disposed between the second polarizer and the liquid crystal panel.

In another aspect of the present invention, the liquid crystal display apparatus further comprises a first pressure sensitive adhesive film and a second pressure sensitive adhesive film. The first pressure sensitive adhesive film is disposed between the first biaxial retardation film and the liquid crystal panel. The second pressure sensitive adhesive film is disposed between the second biaxial retardation film and the liquid crystal panel.

In another aspect of the present invention, the liquid crystal display apparatus further comprises a first three cellulose acetate film and a second three cellulose acetate film. The first three cellulose acetate film is disposed on a surface of the first polarizer far from the first biaxial retardation film. The second three cellulose acetate film is disposed on a surface of the second polarizer far from the second biaxial retardation film.

In contrast to the prior art, the present invention effectively reduces light leakage of the liquid crystal panel in dark mode by disposing the double-layered biaxial retardation films having reasonable retardation values. Hence, the contrast and sharpness at large viewing angles (not the large azimuth angles from the horizontal or vertical directions) are increased to enlarge the viewing angle.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 3:
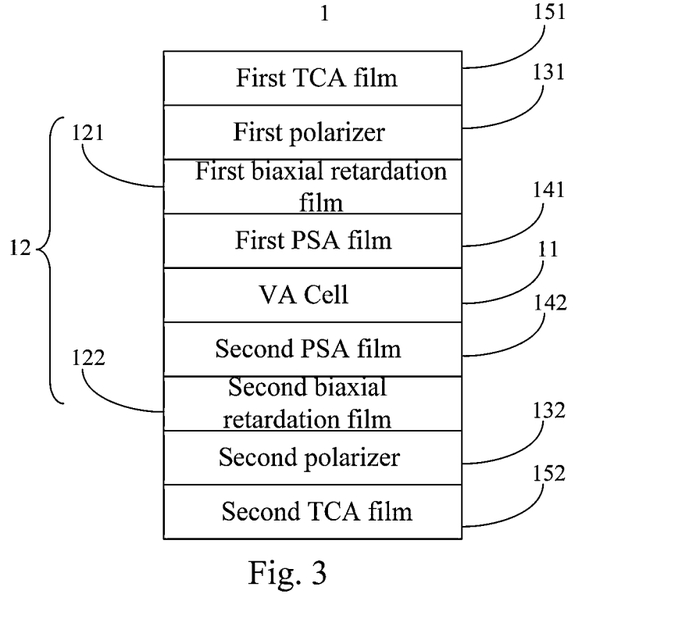
FIG. 3 is a schematic diagram showing a structure of a liquid crystal display apparatus according to a first embodiment of the present invention.

Please refer to FIG. 3, FIG. 3 is a schematic diagram showing a structure of a liquid crystal display apparatus according to a first embodiment of the present invention. In the present embodiment, a liquid crystal display apparatus 1 comprises a liquid crystal panel 11, a compensation system 12, a first polarizer 131, a second polarizer 132, a first pressure sensitive adhesive (PSA) film 141, a second pressure sensitive adhesive film 142, a first triacetyl cellulose (TCA) film 151, and a second triacetyl cellulose film 152.

Figure 4:
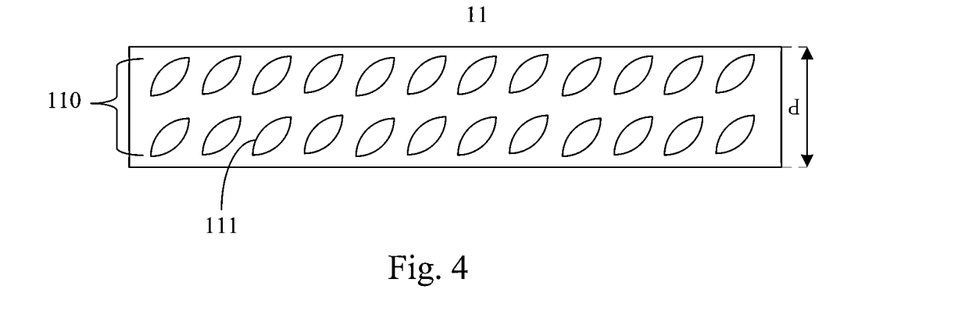
FIG. 4 is schematic diagram showing a structure of the liquid crystal panel according to the first embodiment of the present invention.

In the present invention, the liquid crystal panel 11 is a vertical alignment cell (VA cell). Please further refers to FIG. 4, FIG. 4 is schematic diagram showing a structure of the liquid crystal panel according to the first embodiment of the present invention. A liquid crystal layer 110 comprising a plurality of liquid crystal molecules 111 is disposed in the liquid crystal panel 11. The refractive index anisotropy of the liquid crystal layer 110 with respect to a light having a wavelength of 550 nm is Δn. A thickness of the liquid crystal layer 110 is d. An optical path difference of the liquid crystal layer 110 is Δn×d, and a pre-tilt angle of the liquid crystal molecules 111 is θ, where 324.3 nm≤Δn×d≤342.8 nm and 85°≤θ≤90°.

Figure 5:
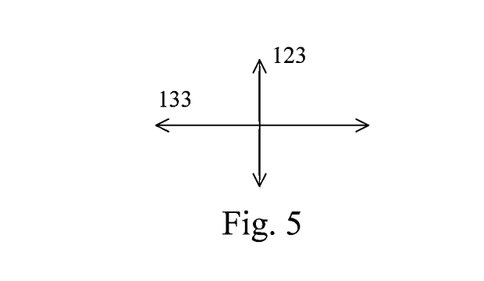
FIG. 5 is schematic diagram showing a light absorption axis of the first polarizer and a slow axis of the first biaxial retardation film according to the first embodiment of the present invention.
Figure 6:
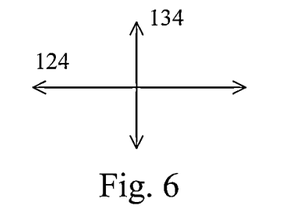
FIG. 6 is schematic diagram showing a light absorption axis of the second polarizer and a slow axis of the second biaxial retardation film according to the first embodiment of the present invention.

The compensation system 12 comprises a first biaxial retardation film 121 and a second biaxial retardation film 122. The first biaxial retardation film 121 and the second biaxial retardation film 122 are respectively disposed on either side of the liquid crystal panel 11. The first polarizer 131 and the first biaxial retardation film 121 are disposed on a same side of the liquid crystal panel 11. Please also refer to FIG. 5, FIG. 5 is schematic diagram showing a light absorption axis of the first polarizer and a slow axis of the first biaxial retardation film according to the first embodiment of the present invention. The light absorption axis 133 of the first polarizer 131 is 90 degrees to the slow axis 123 of the first biaxial retardation film 121. The second polarizer 132 and the second biaxial retardation film 122 are disposed on the other side of the liquid crystal panel 11. Please also refer to FIG. 6, FIG. 6 is schematic diagram showing a light absorption axis of the second polarizer and a slow axis of the second biaxial retardation film according to the first embodiment of the present invention. The light absorption axis 134 of the second polarizer 132 is 90 degrees to the slow axis 124 of the second biaxial retardation film 122. The first polarizer 131 and the second polarizer 132 are preferably polyvinyl alcohol films.

As shown in FIG. 3, the first biaxial retardation film 121 is disposed between the first polarizer 131 and the liquid crystal panel 11. The second biaxial retardation film 122 is disposed between the second polarizer 132 and the liquid crystal panel 11. The first pressure sensitive adhesive film 141 is disposed between the first biaxial retardation film 121 and the liquid crystal panel 11. The second pressure sensitive adhesive film 142 is disposed between the second biaxial retardation film 122 and the liquid crystal panel 11. The first pressure sensitive adhesive film 141 and the second pressure sensitive adhesive film 142 are used for bonding the first biaxial retardation film 121, the second biaxial retardation film 122, and the liquid crystal panel 11. A good bonding effect is achieved within a short time when light pressure is applied to the first pressure sensitive adhesive film 141 or the second pressure sensitive adhesive film 142. The advantage of the first pressure sensitive adhesive film 141 and the second pressure sensitive adhesive film 142 is that they will rapidly wet the contact surfaces like a fluid, but behave like a solid without peeling when being stripped. The first triacetyl cellulose film 151 is disposed on a surface of the first polarizer 131 far from the first biaxial retardation film 121. The second triacetyl cellulose film 152 is disposed on a surface of the second polarizer 132 far from the second biaxial retardation film 122. The first triacetyl cellulose film 151 and the second triacetyl cellulose film 152 will retain the shapes of the first polarizer 131 and the second polarizer 132, and prevent the moisture within the first polarizer 131 and the second polarizer 132 from losing. The first triacetyl cellulose film 151 and the second triacetyl cellulose film 152 have high moisture resistance, low heat shrink, and high durability to ensure the first polarizer 131 and the second polarizer 132 working at a temperature range as high as possible.

An in-plane retardation value of the first biaxial retardation film 121 at a wavelength of 550 nm is Ro1, and an out-of-plane retardation value in a thickness direction of the first biaxial retardation film 121 at a wavelength of 550 nm is Rth1. An in-plane retardation value of the second biaxial retardation film 122 at a wavelength of 550 nm is Ro2, and an out-of-plane retardation value in a thickness direction of the second biaxial retardation film 122 at a wavelength of 550 nm is Rth2.

Figure 7:
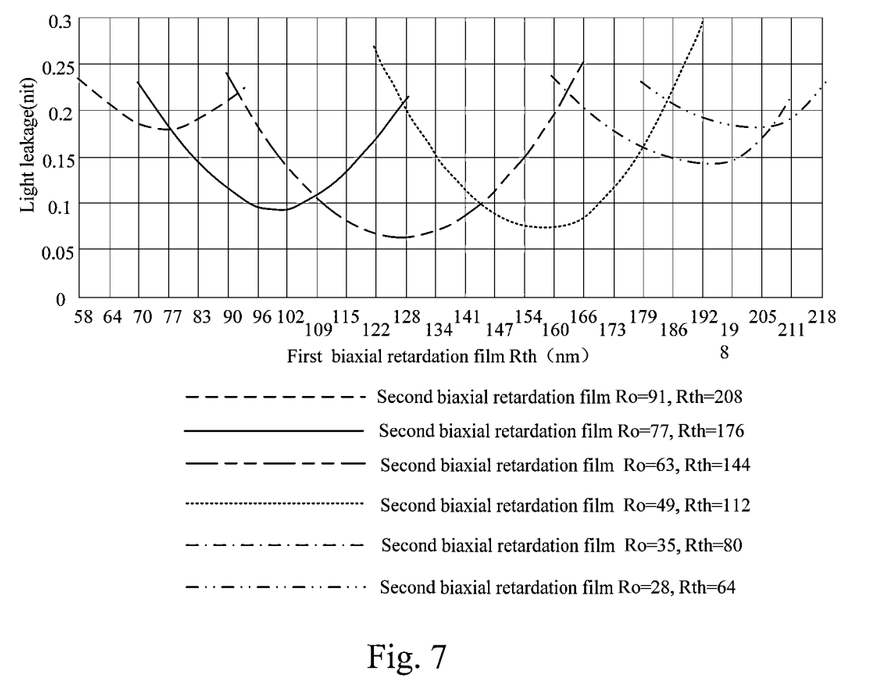
FIG. 7 is a run chart showing a change of light leakage in dark mode with retardation values when the optical path difference ($\Delta n \times d$) of the liquid crystal display apparatus of the first embodiment of the present invention is 324.3 nm.
Figure 8:
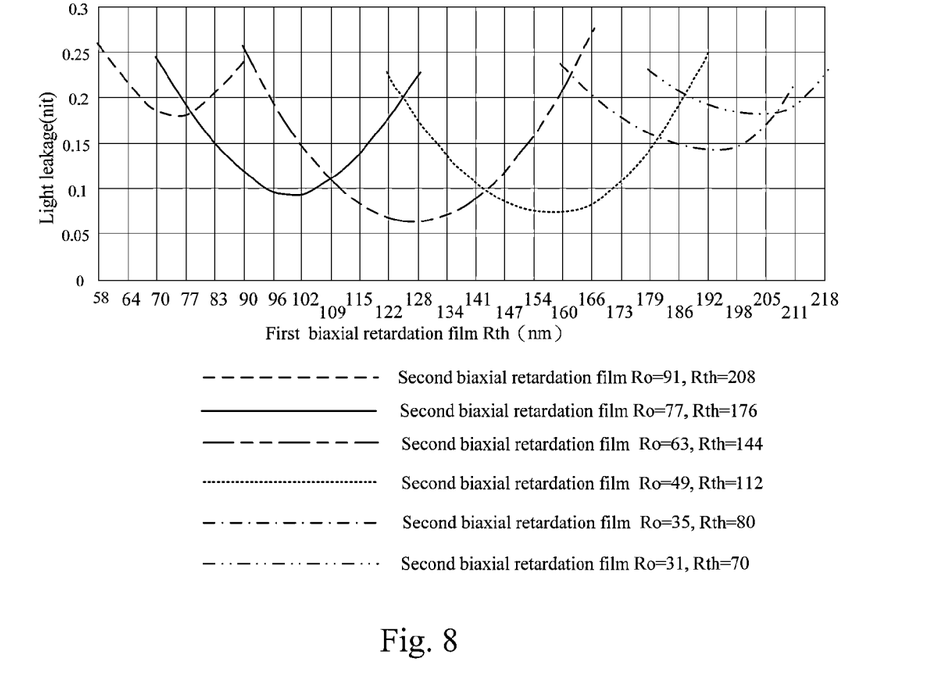
FIG. 8 is a run chart showing a change of light leakage in dark mode with retardation values when the optical path difference ($\Delta n \times d$) of the liquid crystal display apparatus of the first embodiment of the present invention is 342.8 nm.

Please refer to FIG. 7 and FIG. 8, FIG. 7 is a run chart showing a change of light leakage in dark mode with retardation values when the optical path difference (Δn×d) of the liquid crystal display apparatus of the first embodiment of the present invention is 324.3 nm. FIG. 8 is a run chart showing a change of light leakage in dark mode with retardation values when the optical path difference (Δn×d) of the liquid crystal display apparatus of the first embodiment of the present invention is 342.8 nm. As can be seen from FIG. 7 and FIG. 8, at different pre-tilt angles θ of liquid crystal molecules, a trend of the light leakage in dark mode affected by the retardation values of the first biaxial retardation film 121 is similar to a trend of the light leakage in dark mode affected by the retardation values of the second biaxial retardation film 122. That means, at different pre-tilt angles θ of liquid crystal molecules the minimum light leakage in dark mode corresponds to the same range of retardation values.

FIG. 7 and FIG. 8 are utilized to simulate the retardation values with different pre-tilt angles of liquid crystal molecules and different retardation values. Under the circumstances of 324.3 nm≤Δn×d≤342.8 nm and 85°≤θ≤90°, corresponding ranges of the retardation values of the first biaxial retardation film 121 and the second biaxial retardation film 122 when the light leakage is less than 0.2 nit are therefore obtained as follows:

30.8 nm≤$Ro1$≤91 nm;

70.4 nm≤$Rth1$≤208 nm;

21 nm≤$Ro2$≤93.8 nm;

$Y1$≤$Rth2$≤$Y2$;

where:

$Y1 = 0.00424817 \times Rth1^2 - 1.9854256 \times Rth1 + 277.7$;

$Y2 = -0.003333 \times Rth1^2 - 0.033459 \times Rth1 + 234.2$.

The in-plane retardation values of the first biaxial retardation film 121 and the second biaxial retardation film 122 Ro1, Ro2 are both corresponding to a wavelength of 550 nm, and the out-of-plane retardation values in the thickness directions of the first biaxial retardation film 121 and the second biaxial retardation film 122 are corresponding to a wavelength of 550 nm. When the retardation values are within the above-mentioned ranges, the liquid crystal display apparatus will obtain the best compensation effect to minimize the light leakage in dark mode.

The first biaxial retardation film 121 is usually the same as the second biaxial retardation film 122 in industrial production. In other words, the in-plane retardation values Ro1, Ro2 are the same, and the out-of-plane retardation values in the thickness directions Rth1, Rth2 are the same. It is therefore more convenient since there is no need to strictly distinguish between the first biaxial retardation film 121 and the second biaxial retardation film 122. In a second embodiment, reasonable ranges of retardation values are designed based on the fact that the in-plane retardation values of the first biaxial retardation film 121 and the second biaxial retardation film 122 Ro1, Ro2 are the same, and the out-of-plane retardation values in the thickness directions of the first biaxial retardation film 121 and the second biaxial retardation film 122 Rth1, Rth2 are the same.

Figure 9:
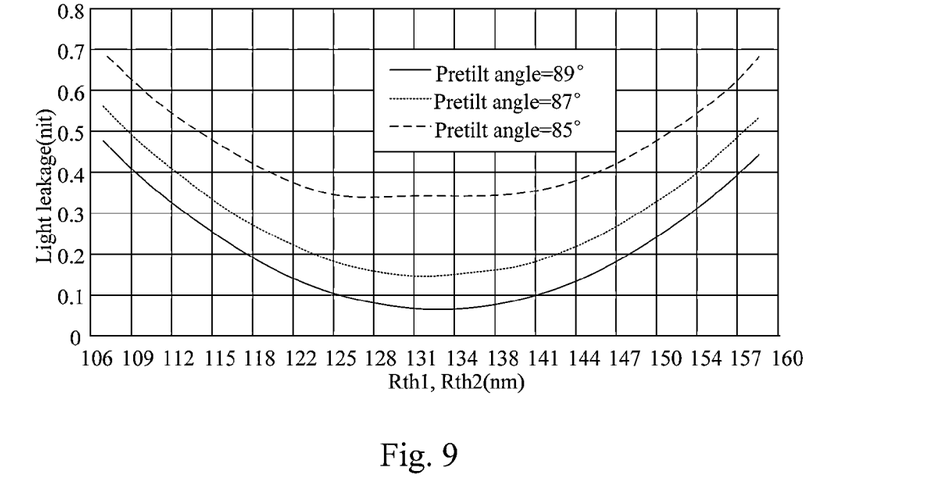
FIG. 9 is a run chart showing a change of light leakage in dark mode with retardation values when an optical path difference of a liquid crystal display apparatus of a second embodiment of the present invention is 324.3 nm.
Figure 10:
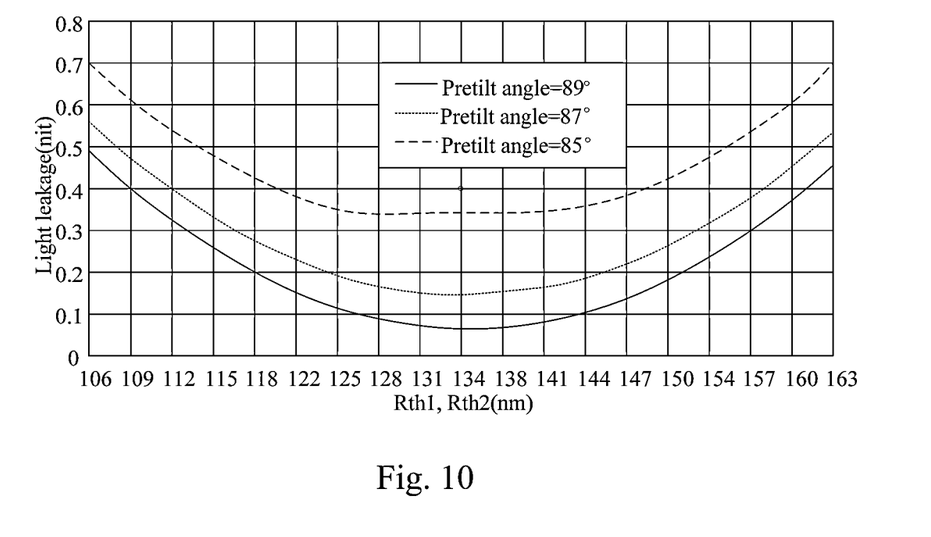
FIG. 10 is a run chart showing a change of light leakage in dark mode with retardation values when the optical path difference of the liquid crystal display apparatus of the second embodiment of the present invention is 342.8 nm.

Please refer to FIG. 9 and FIG. 10. FIG. 9 is a run chart showing a change of light leakage in dark mode with retardation values when an optical path difference of a liquid crystal display apparatus of a second embodiment of the present invention is 324.3 nm. FIG. 10 is a run chart showing a change of light leakage in dark mode with retardation values when the optical path difference of the liquid crystal display apparatus of the second embodiment of the present invention is 342.8 nm.

Similarly, FIG. 9 and FIG. 10 are utilized to simulate the retardation values with different pre-tilt angles of liquid crystal molecules and different retardation values. Under the circumstances of 324.3 nm≤Δn×d≤342.8 nm and 85°≤θ≤90°, reasonable ranges of in-plane retardation values Ro1 and Ro2, which are the same, and out-of-plane retardation values in the thickness directions Rth1 and Rth2, which are the same, are therefore obtained as follows:

48.3 nm≤$Ro$1=$Ro$2≤66.5 nm;

110.4 nm≤$Rth$1=$Rth$2≤152 nm.

Figure 11:
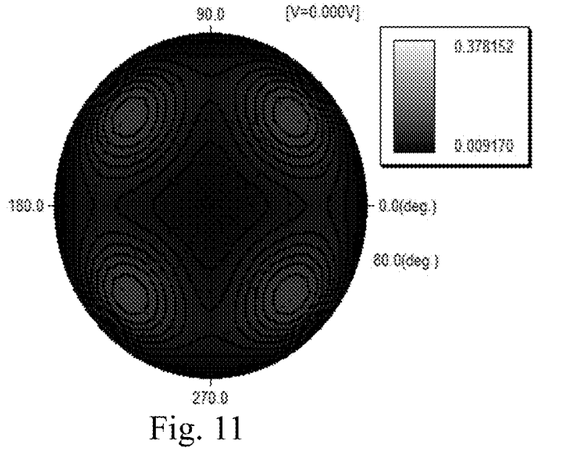
FIG. 11 is a distribution map of light leakage in dark mode after being compensated by a compensation system according to an embodiment of the present invention.
Figure 12:
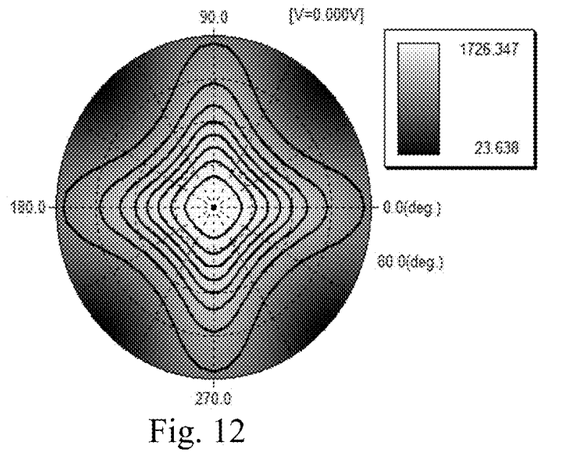
FIG. 12 is a distribution map of contrast over all viewing angles after being compensated by the compensation system according to the embodiment of the present invention.

Please refer to FIG. 11 and FIG. 12. FIG. 11 is a distribution map of light leakage in dark mode after being compensated by a compensation system according to an embodiment of the present invention. FIG. 12 is a distribution map of contrast over all viewing angles after being compensated by the compensation system according to the embodiment of the present invention. The conditions in FIG. 11 and FIG. 12 are set as follows. The optical path difference Δn×d is 342.8 nm. The pre-tilt angle θ of the liquid crystal molecules is 89°. The in-plane retardation values of the first biaxial retardation film 121 and the second biaxial retardation film 122 are Ro1=Ro2=56 nm. The out-of-plane retardation values in the thickness directions of the first biaxial retardation film 121 and the second biaxial retardation film 122 are Rth1=Rth2=128 nm.

When comparing FIG. 11 with FIG. 1, it is observed that, after being compensated by the compensation system according to the embodiment of the present invention, the light leakage in dark mode is much less than that after being compensated by the prior art double-layered biaxial retardation film. When comparing FIG. 12 with FIG. 2, it is observed that the contrast distribution over all viewing angles after being compensated by the compensation system according to the embodiment of the present invention is superior that after being compensated by the prior art double-layered biaxial retardation film.

Those skilled in the art may change the prior art biaxial retardation film to the biaxial retardation film with retardation values satisfying the above-mentioned ranges. Specifically, the in-plane retardation value Ro of the biaxial retardation film, the out-of-plane retardation value Rth in a thickness direction of the biaxial retardation film, the refractive index N, and the thickness d must satisfy the following equation:

$$Ro = (Nx - Ny) \times d$$
$$Rth = [(Nx + Ny)/2 - Nz] \times d$$

By employing the equations, the in-plane retardation value of the biaxial retardation film and the out-of-plane retardation value in the thickness direction of the biaxial retardation film may be changed in many ways. For example, on the basis of not changing the refractive index N of the biaxial retardation film, the retardation values can be changed by changing the thickness d. Or, on the basis of not changing the thickness d of the biaxial retardation film, the retardation values can be changed by changing the refractive index N. Of course, the retardation values can be changed by changing the thickness d of the biaxial retardation film and the refractive index N at the same time.

The present invention further provides the above-mentioned compensation system used for liquid crystal panels.

Those skilled in the art are able to modify the structure proposed by the first embodiment of the present invention. For example, to exchange positions of the first biaxial retardation film 121 and the second biaxial retardation film 122 is within the scope of the present invention. In the present invention, the positions of the double-layered biaxial retardation films are not limited, a better compensation effect can be achieved by utilizing the biaxial retardation films with retardation values satisfying the above-mentioned ranges.

In contrast to the prior art, the present invention effectively reduces light leakage of the liquid crystal panel in dark mode by disposing the double-layered biaxial retardation films having reasonable retardation values.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display apparatus, comprising:
    a liquid crystal panel comprising a liquid crystal layer having a plurality of liquid crystal molecules, birefringence to a refractive index of the liquid crystal layer at a wavelength of 550nm being Δn, a thickness of the liquid crystal layer being d, and a pre-tilt angle of the liquid crystal molecules being θ;
    a first biaxial retardation film and a second biaxial retardation film respectively disposed on either side of the liquid crystal panel, an in-plane retardation value of the first biaxial retardation film at the wavelength of 550nm being Ro1, an out-of-plane retardation value in a thickness direction of the first biaxial retardation film at the wavelength of 550nm being Rth1, an in-plane retardation value of the second biaxial retardation film at the wavelength of 550nm being Ro2, and an out-of-plane retardation value in a thickness direction of the second biaxial retardation film at the wavelength of 550nm being Rth2, wherein:

$324.3\text{nm} \leq \Delta n \times d \leq 342.8\text{nm}$;

$85° \leq \theta \leq 90°$;

$30.8 \text{ nm} \leq Ro1 \leq 91 \text{ nm}$;

$70.4\text{nm} \leq Rth1 \leq 208\text{nm}$;

$21\text{nm} \leq Ro2 \leq 93.8\text{nm}$;

$Y1 \leq Rth2 \leq Y2$;

$Y1 = 0.00424817 \times Rth1^2 - 1.9854256 \times Rth1 + 277.7$;

$Y2 = -0.003333 \times Rth1^2 - 0.033459 \times Rth1 + 234.2$.

2. The liquid crystal display apparatus as claimed in claim 1, wherein:

$48.3\text{nm} \leq Ro1 = Ro2 \leq 66.5\text{nm}$;

$110.4\text{nm} \leq Rth1 = Rth2 \leq 152\text{nm}$.

3. The liquid crystal display apparatus as claimed in claim 1, wherein:
the liquid crystal display apparatus further comprises a first polarizer and a second polarizer respectively disposed on either side of the liquid crystal panel, the first polarizer and the first biaxial retardation film are disposed on a same side of the liquid crystal panel, a light absorption axis of the first polarizer is 90 degrees to a slow axis of the first biaxial retardation film, the second polarizer and the second biaxial retardation film are disposed on the other side of the liquid crystal panel, a light absorption axis of the second polarizer is 90 degrees to a slow axis of the second biaxial retardation film.

4. The liquid crystal display apparatus as claimed in claim 3, wherein the first polarizer and the second polarizer are both polyvinyl alcohol films.

5. The liquid crystal display apparatus as claimed in claim 3, wherein the first biaxial retardation film is disposed between the first polarizer and the liquid crystal panel, the second biaxial retardation film is disposed between the second polarizer and the liquid crystal panel.

6. The liquid crystal display apparatus as claimed in claim 5, further comprising a first pressure sensitive adhesive film and a second pressure sensitive adhesive film, the first pressure sensitive adhesive film being disposed between the first biaxial retardation film and the liquid crystal panel, the second pressure sensitive adhesive film being disposed between the second biaxial retardation film and the liquid crystal panel.

7. The liquid crystal display apparatus as claimed in claim 6, further comprising a first triacetyl cellulose film and a second triacetyl cellulose film, the first triacetyl cellulose film being disposed on a surface of the first polarizer far from the first biaxial retardation film, the second triacetyl cellulose film being disposed on a surface of the second polarizer far from the second biaxial retardation film.

* * * * *